( 12 ) United States Patent
Kim

(10) Patent No.: US 10,745,043 B2
(45) Date of Patent: Aug. 18, 2020

(54) APPARATUS FOR COMPENSATING FOR LOW TEMPERATURE TORQUE OF MOTOR DRIVEN POWER STEERING AND CONTROL METHOD THEREOF

(71) Applicant: HYUNDAI MOBIS CO., LTD., Seoul (KR)

(72) Inventor: Tae Hong Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 254 days.

(21) Appl. No.: 15/924,446

(22) Filed: Mar. 19, 2018

(65) Prior Publication Data

US 2018/0265121 A1    Sep. 20, 2018

(30) Foreign Application Priority Data

Mar. 20, 2017  (KR) .................. 10-2017-0034544

(51) Int. Cl.
*B62D 5/04*  (2006.01)
*B62D 15/02* (2006.01)
*B62D 6/10*  (2006.01)
*B62D 6/02*  (2006.01)

(52) U.S. Cl.
CPC ......... *B62D 5/0463* (2013.01); *B62D 5/0496* (2013.01); *B62D 6/02* (2013.01); *B62D 6/10* (2013.01); *B62D 15/021* (2013.01)

(58) Field of Classification Search
CPC ...... B62D 5/0463; B62D 5/0496; B62D 6/02; B62D 6/10; B62D 15/021
USPC .......................................................... 701/41
See application file for complete search history.

(56) References Cited

U.S. PATENT DOCUMENTS

2016/0090120 A1*  3/2016  Yang .................... B62D 5/0463
                                                  701/41

FOREIGN PATENT DOCUMENTS

KR    10-2016-0142173    * 12/2016

* cited by examiner

*Primary Examiner* — Maceeh Anwari
(74) *Attorney, Agent, or Firm* — H.C. Park & Associates, PLC

(57) ABSTRACT

An apparatus for compensating for low-temperature torque of an MDPS including a column torque sensor configured to detect a column torque; a vehicle speed sensor configured to detect a vehicle speed; a temperature sensor configured to measure a temperature of the vehicle; a steering angle sensor configured to detect a steering angle of a steering wheel; and a controller configured to calculate an assist torque, calculate a vehicle speed gain and a compensation gain for the temperature and an accumulated steering angle based on the vehicle speed, the temperature and the steering angle, calculate a final compensation gain by applying a compensation gain attenuation rate, calculate a final assist torque by applying the final compensation gain to the assist torque, and output the final assist torque.

8 Claims, 6 Drawing Sheets

APPARATUS FOR COMPENSATING FOR LOW TEMPERATURE TORQUE OF MOTOR DRIVEN POWER STEERING AND CONTROL METHOD THEREOF

CROSS-REFERENCES TO RELATED APPLICATION

The application claims priority from and the benefit of Korean Patent No. 10-2017-0034544, filed on Mar. 20, 2017, which is hereby incorporated by reference for all purposes as if set forth herein.

BACKGROUND

Field

Exemplary embodiments relates to an apparatus for compensating for a low temperature torque of a motor driven power steering (MDPS) and a control method thereof, and more particularly, to an apparatus for compensating for a low temperature torque of an MDPS, which not only remove a sense of difference in response to an increase of friction caused by contractions of mechanical parts or an increase in viscosity of grease in the MDPS at low temperature, but also increase an effort amount while suppressing an occurrence of vibration during steering on a low-friction road at an ultra-low temperature, and a control method thereof.

Discussion of the Background

In general, an MDPS refers to a system that provides an assist torque in a steering direction of a driver, using an electric motor, and thus enables the driver to easily handle a steering wheel.

Unlike an existing hydraulic power steering (HPS), the MDPS can automatically control the operation of the electric motor depending on a driving condition of a vehicle, thereby improving steering performance and steering feel.

At this time, the MDPS includes a torque sensor and a vehicle speed sensor, in order to determine the driving condition of the vehicle. The torque sensor measures a steering torque of the driver, inputted to the steering wheel, and the vehicle speed sensor measures a vehicle speed.

The MDPS is configured to transfer the steering torque generated by rotation of the steering wheel to a rack bar through a rack-pinion mechanism, and transfer steering assist power generated by the motor to the rack bar depending on the generated steering torque. That is, the steering torque generated by the steering wheel and the steering assist power generated by the motor are combined to move the rack bar in the axial direction.

When a vehicle having an MDPS installed therein is started up and steered after having been parked in a sub-zero environment such as the winter season or a cold area for a long time, components constituting a mechanical part such as the rack-pinion mechanism or an input shaft may be contracted at low temperature or frozen by fluid, or the viscosity of lubricant such grease may increase so as not to smoothly move unlike at room temperature. Then, the friction force of the steering wheel may be increased.

In this case, a driver who has been accustomed to a steering feel at room temperature may have a sense of difference. Thus, the driver may have an anxiety about steering, due to a sudden change of the steering feel.

The related art of the present invention is disclosed in Korean Patent Publication No. 2016-0142173 published on Dec. 12, 2016 and entitled "Method for varying assist torque of steering motor at low-temperature condition".

According to the related art, the method performs current control to compensate for a motor current such that the steering mechanism of the MDPS can be smoothly operated even in a low-temperature environment. Thus, the method can minimize a sense of difference in steering, felt by a driver, while improving the reliability of the MDPS.

However, when a temperature measured by a temperature sensor in real time is applied to a torque compensation cancellation condition in order to compensate for a motor current in a low-temperature environment, the temperature may have a different tendency from the outside temperature due to a large current change caused by end steering or road condition. Therefore, when the compensation for the motor current is performed based on the temperature, an unexpected steering feel may be caused to make the driver feel a sense of difference.

In an ultra-low temperature environment, the road surface is generally frozen or wet. Therefore, when a compensation gain at a low-friction road is not corrected but raised, the MDPS may be vulnerable to vibration due to high-frequency noise.

The above information disclosed in this Background section is only for enhancement of understanding of the background of the invention and, therefore, it may contain information that does not constitute prior art.

SUMMARY

Exemplary embodiments of the present invention are directed to an apparatus for compensating for a low temperature torque of an MDPS, which not only remove a sense of difference in response to an increase of friction caused by contractions of mechanical parts or an increase in viscosity of grease in the MDPS at low temperature, but also increase an effort amount while suppressing an occurrence of vibration during steering on a low-friction road at an ultra-low temperature, and a control method thereof.

In one embodiment, an apparatus for compensating for low-temperature torque of an MDPS may include: a column torque sensor configured to detect a column torque applied to a steering shaft, and output the detected column torque; a vehicle speed sensor configured to detect a vehicle speed; a temperature sensor configured to measure a temperature of the vehicle; a steering angle sensor configured to detect a steering angle of a steering wheel; an operation time calculator configured to calculate an operation time after a startup of the vehicle; and a controller configured to calculate an assist torque based on the column torque and the vehicle speed which are received from the column torque sensor and the vehicle speed sensor, calculate a vehicle speed gain and a compensation gain for the temperature and an accumulated steering angle based on the vehicle speed, the temperature and the steering angle which are received from the vehicle speed sensor, the temperature sensor and the steering angle sensor, calculate a final compensation gain by applying a compensation gain attenuation rate depending on the operation time based on a time required for reaching a normal state depending on the temperature, calculate a final assist torque by applying the final compensation gain to the assist torque depending on a frequency region of the column torque, and output the final assist torque.

The controller may include: an assist torque calculation unit configured to receive the column torque and the vehicle speed from the column torque sensor and the vehicle speed sensor, and calculate the assist torque; a filtering unit configured to filter the column torque depending on the frequency region of the column torque inputted from the column torque sensor; a low-temperature torque compensation unit configured to receive the vehicle speed, the temperature and the steering angle from the vehicle speed sensor, the temperature sensor and the steering angle sensor, respectively, calculate the vehicle speed gain and the compensation gain for the temperature and the accumulated steering angle, and calculate the final compensation gain by applying the compensation gain attenuation rate depending on the operation time, based on the time required for reaching the normal state depending on the temperature; and an assist torque output unit configured to apply the final compensation gain outputted from the low-temperature torque compensation unit to the column torque filtered by the filtering unit, compensate for the assist torque calculated by the assist torque calculation unit by reducing the resonance frequency of the MDPS through high-frequency gain control, and output the final assist torque.

The filtering unit may include a low pass filter.

The assist torque output unit may include any one of a lead-lag filter and a notch filter in order to avoid the resonance frequency of the MDPS.

The filtering unit may have a cutoff frequency equal to the natural frequency of the lead-lag filter.

The low-temperature torque compensation unit may include: a vehicle speed gain calculation unit configured to receive the vehicle speed from the vehicle speed sensor, and calculate the vehicle speed gain which is decoupled depending on the vehicle speed; an steering angle accumulation unit configured to calculate the accumulated steering angle by accumulating the steering angles received from the steering angle sensor; a compensation gain calculation unit configured to calculate the compensation gain depending on the temperature and the accumulated steering angle; a normal state reaching time calculation unit configured to calculate the time required for reaching the normal state depending on the initial temperature after the startup of the vehicle; a compensation gain attenuation rate calculation unit configured to calculate the compensation gain attenuation rate depending on the operation time, based on the time required for reaching the normal state; and a compensation gain output unit configured to receive the vehicle speed gain, the compensation gain and the compensation gain attenuation rate, and output the final compensation gain.

In another embodiment, a control method of an apparatus for compensating for low-temperature torque of an MDPS may include: receiving, by a controller, a temperature from a temperature sensor after a startup of a vehicle; receiving, by the controller, a steering angle from a steering angle sensor and calculating an accumulated steering angle; calculating, by the controller, a compensation gain depending on the temperature and the accumulated steering angle; calculating, by the controller, a compensation gain attenuation rate depending on an operation time, based on a time required for reaching a normal state depending on the initial temperature; receiving, by the controller, a column torque and a vehicle speed from a column torque sensor and a vehicle speed sensor, respectively, and calculating an assist torque; receiving, by the controller, the vehicle speed from the vehicle speed sensor, and calculating a vehicle speed gain; calculating, by the controller, a final compensation gain by applying the compensation gain and the compensation gain attenuation rate to the vehicle speed gain; and receiving, by the controller, the column torque from the column torque sensor, filtering the column torque, applying the filtering result to the final compensation gain, compensating for the assist torque, and outputting a final assist torque.

The filtering of the column torque may include filtering the column torque through a low pass filter.

The outputting of the final assist torque may include avoiding the resonance frequency of the MDPS through any one of a lead-lag filter and a notch filter.

When the controller filters the column torque, a cutoff frequency may be equal to the natural frequency of the lead-lag filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Figure 1:
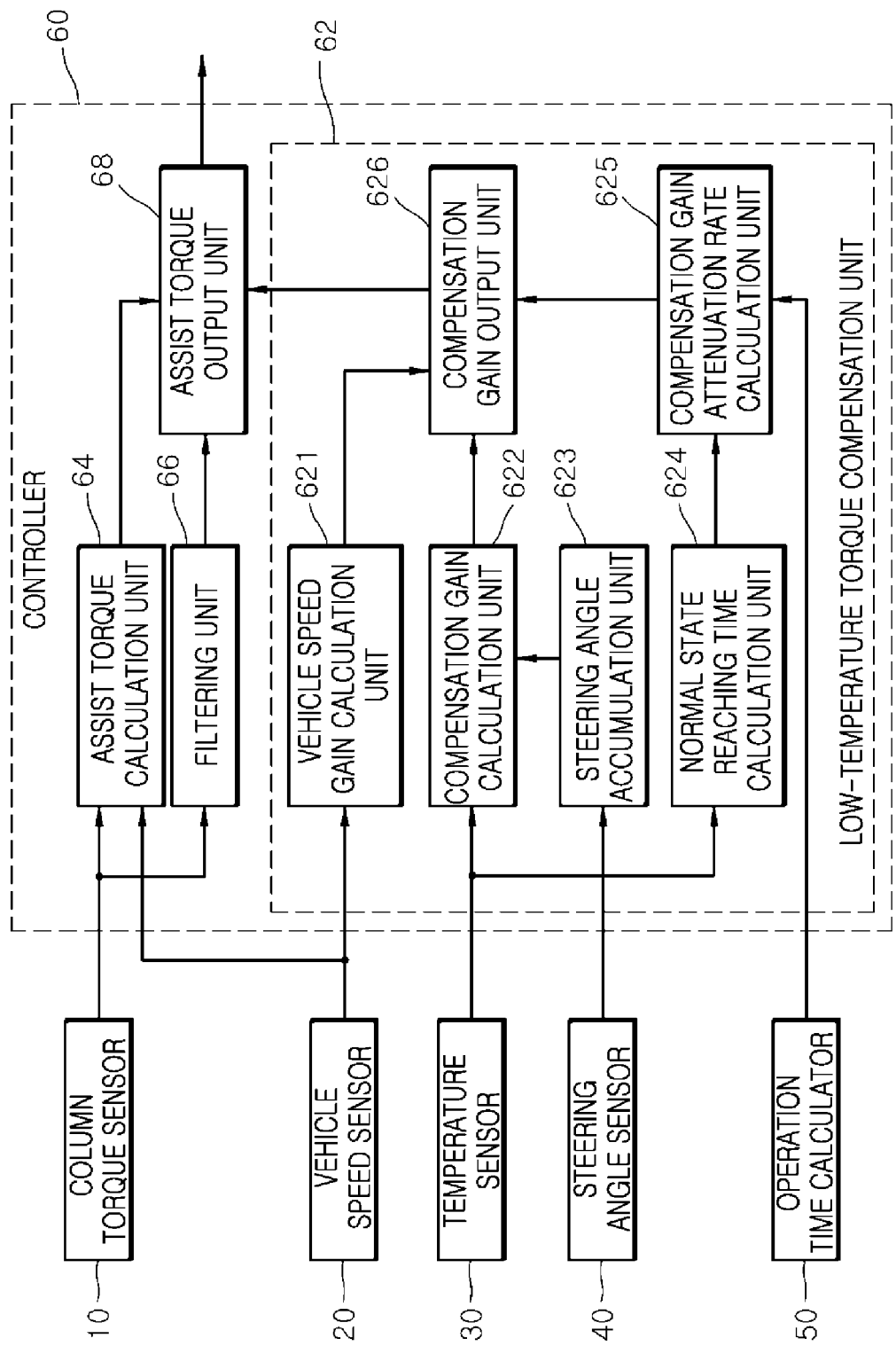
FIG. 1 is a configuration diagram illustrating an apparatus for compensating for low-temperature torque of an MDPS in accordance with an embodiment of the present invention.

FIG. 1 is a configuration diagram illustrating an apparatus for compensating for low-temperature torque of an MDPS in accordance with an embodiment of the present invention.

As illustrated in FIG. 1, the apparatus for compensating for low-temperature torque of an MDPS in accordance with the embodiment of the present invention may include a column torque sensor 10, a vehicle speed sensor 20, a temperature sensor 30, a steering angle sensor 40, an operation time calculator 50 and a controller 60.

The column torque sensor 10 may detect a column torque applied to a steering shaft (not illustrated), and output the detected column torque to the controller 60.

The vehicle speed sensor 20 may detect a speed of the vehicle, and provide the detected speed to the controller 60.

The temperature sensor 30 may detect a temperature of the vehicle, and provide the detected temperature to the controller 60.

At this time, the temperature sensor 30 may be preferably disposed at a mechanical member constituting a steering system or power-driven device.

The steering angle sensor 40 may detect a steering angle of a steering wheel, and provides the detected steering angle to the controller 60.

The operation time calculator 50 may calculate an operation time which has elapsed after the vehicle was started, and provide the calculated operation time to the controller 60.

The controller 60 may calculate an assist torque based on the column torque and the vehicle speed which are received from the column torque sensor 10 and the vehicle speed sensor 20, calculate a vehicle speed gain and a compensation gain for the temperature and the accumulated steering angle based on the vehicle speed, the temperature and the steering angle which are received from the vehicle speed sensor 20, the temperature sensor 30 and the steering angle sensor 40, calculate a final compensation gain by applying a compensation gain attenuation rate depending on the operation time based on a time required for reaching a normal state according to the temperature, and output a final assist torque by applying the final compensation gain to the assist torque depending on the frequency region of the column torque.

The controller 60 in accordance with the present embodiment may include an assist torque calculation unit 64, a filtering unit 66, a low-temperature torque compensation unit 62 and an assist torque output unit 68.

The assist torque calculation unit 64 may receive a column torque and vehicle speed from the column torque sensor 10 and the vehicle speed sensor 20, and calculate an assist torque to assist the MDPS.

The filtering unit 66 may filter the column torque inputted from the column torque sensor 10 depending on the frequency region of the column torque. When steering is performed while the road surface is frozen or wet in an ultra-low temperature state, high-frequency noise may be amplified and applied to the assist torque. In this case, a control margin may be reduced to cause vibration. In order to solve such a problem, the filtering unit 66 may optimize the compensation gain by performing filtering through a low-pass filter, thereby reducing a frictional force caused by low temperature without a sense of difference in steering.

The low-temperature torque compensation unit 62 may receive the vehicle speed, the temperature and the steering angle from the vehicle speed sensor 20, the temperature sensor 30 and the steering angle sensor 40, respectively, and calculate the final compensation gain by applying the vehicle speed gain, the compensation gain for the temperature and accumulated steering angle, and the compensation gain attenuation rate depending on the operation time, based on the time required for reaching a normal state depending on the temperature.

The low-temperature torque compensation unit 62 in accordance with the present embodiment may include a vehicle speed gain calculation unit 621, a steering angle accumulation unit 623, a compensation gain calculation unit 622, a normal state reaching time calculation unit 624, a compensation gain attenuation rate calculation unit 625 and a compensation gain output unit 626.

Figure 2:
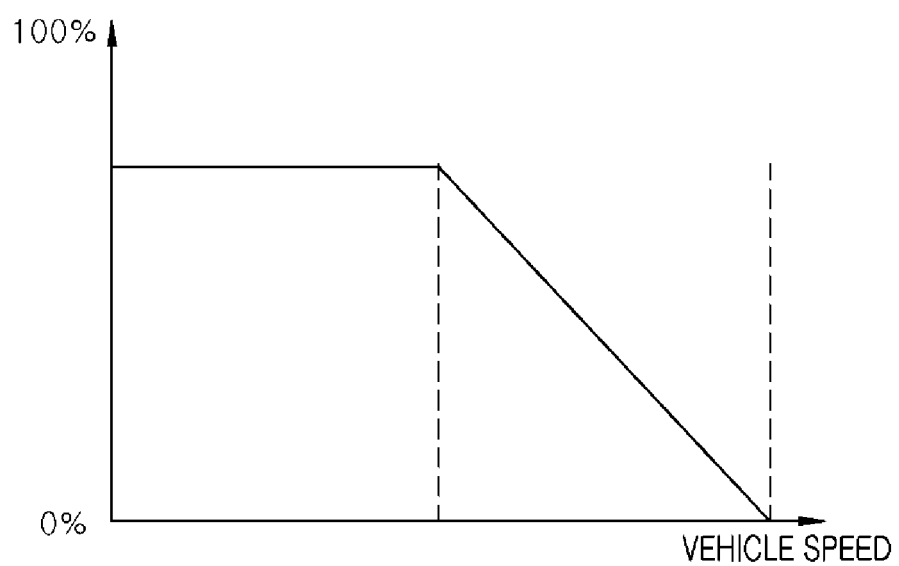
FIG. 2 is a graph illustrating a gain for each vehicle speed in the apparatus for compensating for low-temperature torque of an MDPS in accordance with the embodiment of the present invention.

The vehicle speed gain calculation unit 621 may receive the vehicle speed from the vehicle speed sensor 20, and calculate the vehicle speed gain which is decoupled depending on the vehicle speed as illustrated in FIG. 2.

The steering angle accumulation unit 623 may receive steering angles of the steering angle sensor 40, and calculate the accumulated steering angle by accumulating the steering angles.

The compensation gain calculation unit 622 may calculate the compensation gain depending on the temperature and the accumulated steering angle, based on the temperature inputted from the temperature sensor 30 and the accumulated steering angle calculated by the steering angle accumulation unit 623.

Figure 3:
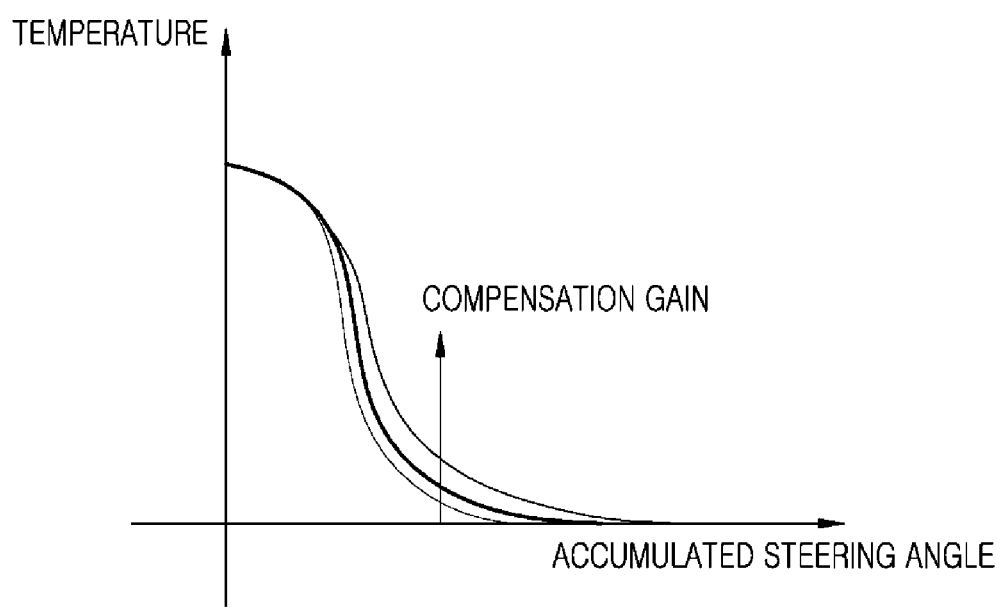
FIG. 3 is a graph illustrating a compensation gain depending on a temperature and accumulated steering angle in the apparatus for compensating for low-temperature torque of an MDPS in accordance with the embodiment of the present invention.

Depending on the low-temperature range, the components constituting the steering system or motor driven device may be contracted or frozen at different levels, or the viscosity of lubricant may also be differently increased. Thus, the components constituting the steering system or motor-driven device may have different strengths or require different operation times until the normal state is recovered. Therefore, the compensation gain depending on the temperature and accumulated steering angle may be defined and optimized as a lookup table as illustrated in FIG. 3.

The normal state reaching time calculation unit 624 may calculate a time required for reaching a normal state depending on the initial temperature after the startup of the vehicle.

Figure 4:
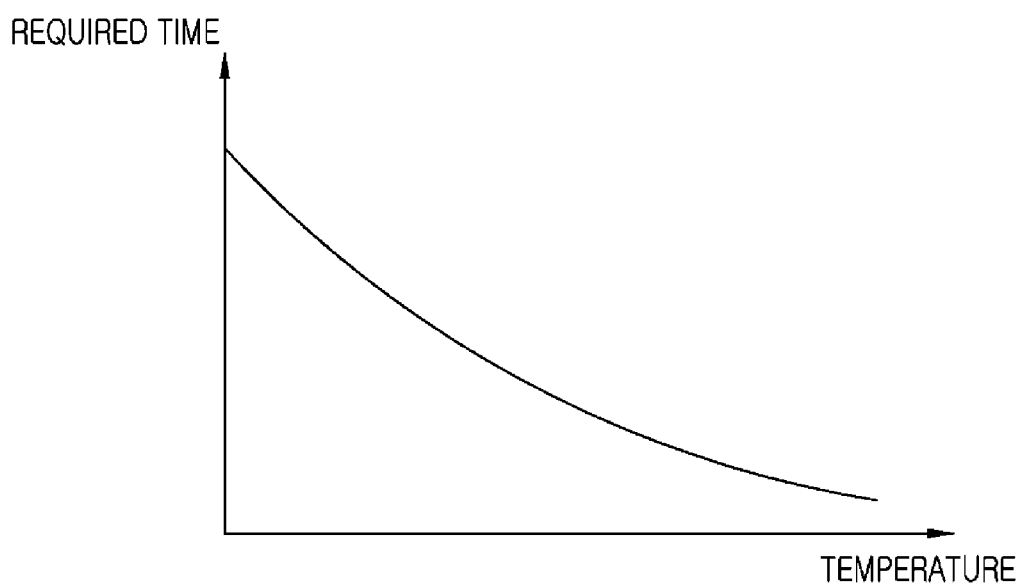
FIG. 4 is a graph illustrating a time required for reaching a normal state depending on a temperature in the apparatus for compensating for low-temperature torque of an MDPS in accordance with the embodiment of the present invention.

The time required for reaching a normal state may be defined as a lookup table depending on the temperature as illustrated in FIG. 4.

The compensation gain attenuation rate calculation unit 625 may calculate a compensation gain attenuation rate depending on the operation time, based on the time required for reaching a normal state.

The compensation gain output unit 626 may receive the vehicle speed gain, the compensation gain and the compensation gain attenuation rate, calculate the final compensation gain by multiplying the vehicle speed gain, the compensation gain and the compensation gain attenuation rate, and output the final compensation gain.

That is, in order to reduce a heavy steering feel or sense of difference which may occur when a frictional force is raised by contraction of mechanical parts or the increase in viscosity of grease during driving at low temperature, the low-temperature torque compensation unit 62 may receive the initial temperature from the temperature sensor 30 after the startup of the vehicle, calculate the compensation gain according to the temperature in the low-temperature state and the steering angle accumulated during steering, and compensate for the assist torque.

As the operation time of the vehicle elapses, heat transferred from an engine or the like may lower the viscosity of grease or return the mechanical parts to the normal state from the contraction. Therefore, the low-temperature torque compensation unit 62 may calculate the compensation gain attenuation rate depending on the operation time based on the time required for reaching the normal state from the initial temperature, and calculate the final compensation gain by multiplying the compensation gain attenuation rate by the compensation gain, in order to apply a compensation gain suitable for the situation.

The assist torque output unit 68 may apply the final compensation gain outputted from the low-temperature torque compensation unit 62 to the column torque filtered by the filtering unit 66, reduce the resonance frequency of the MDPS by adjusting a high-frequency gain, compensate for the assist torque calculated by the assist torque calculation unit 64, and output the final assist torque.

Figure 5:
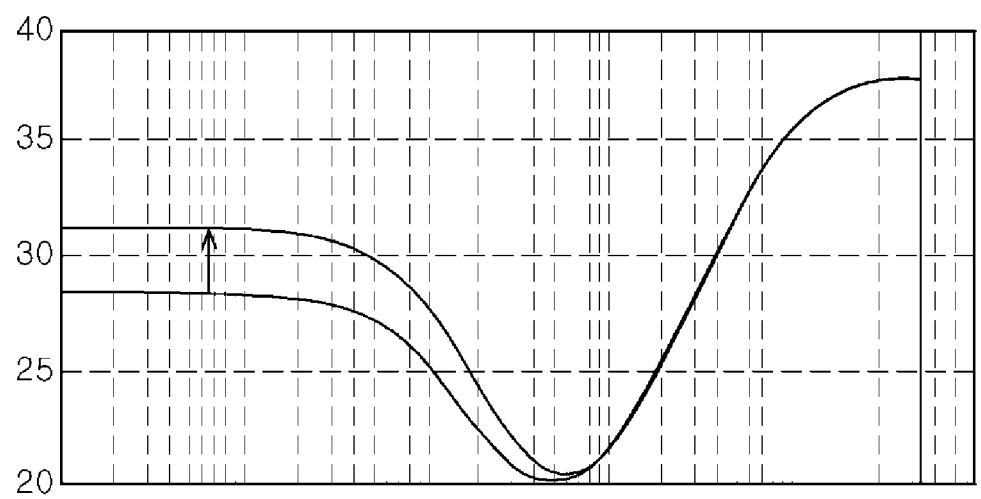
FIG. 5 is a graph illustrating a compensation gain for each frequency region in the apparatus for compensating for low-temperature torque of an MDPS in accordance with the embodiment of the present invention.

In order to avoid the resonance frequency of the MDPS, the assist torque output unit 68 may include any one of a lead-lag filter and notch filter to control the high-frequency gain. Thus, as illustrated in FIG. 5, the assist torque output unit 68 may not increase a gain of the high-frequency region, but increase only a gain of the low-frequency region before the resonance frequency.

This operation can prevent a reduction in stability of the MDPS sensitive to high-frequency noise on a low-friction road while increasing a basic steering effort amount.

In order to control only the low-frequency region, the cutoff frequency of the filtering unit 66 may be set to the same frequency as the natural frequency of the lead-lag filter, such that a sudden change of the steering feel can be reduced without a deformation of a characteristic pattern. Thus, a sense of difference in steering can be reduced, and a heavy steering feel can be removed.

As described above, the apparatus for compensating for low-temperature torque of an MDPS in accordance with the embodiment of the present invention can not only remove a sense of difference during steering in response to an increase of friction caused by the contraction of the mechanical parts or the increase in viscosity of grease in the MDPS, but also increase the effort amount while suppressing an occurrence of vibration during steering on a low-friction road at an ultra-low temperature, which makes it possible to improve the convenience.

Figure 6:
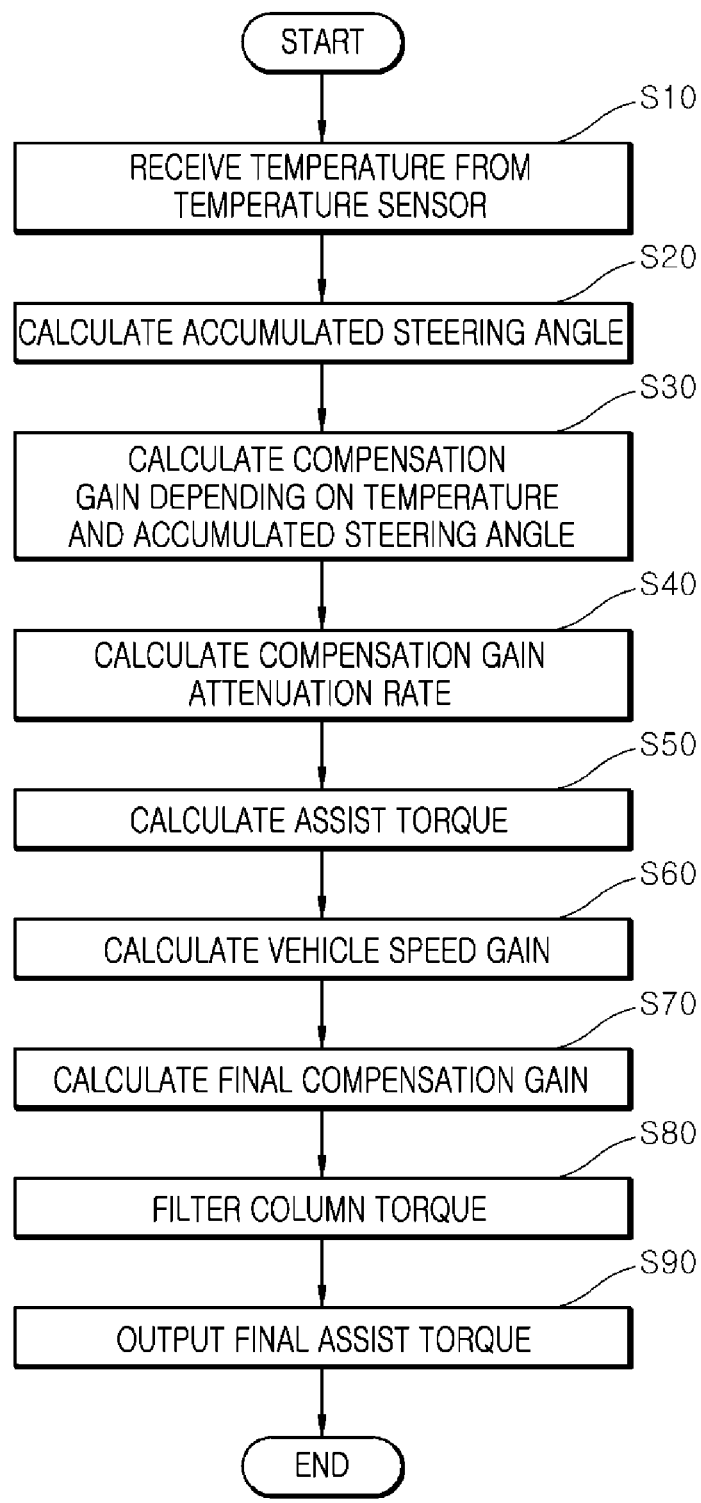
FIG. 6 is a flowchart illustrating a control method of an apparatus for compensating for low-temperature torque of an MDPS in accordance with an embodiment of the present invention.

FIG. 6 is a flowchart illustrating a control method of the apparatus for compensating for low-temperature torque of an MDPS in accordance with the embodiment of the present invention.

As illustrated in FIG. 6, the control method of the apparatus for compensating for low-temperature torque of an MDPS in accordance with the embodiment of the present invention may begin with step S10 in which the controller 60 receives a temperature from the temperature sensor 30 after a startup of the vehicle.

At this time, the temperature sensor 30 may be installed at a mechanical member constituting the steering system or motor-driven device, in order to detect a friction increase caused by contraction of the mechanical member or an increase in viscosity of grease in the MDPS at low temperature.

The controller 60 may receive a steering angle from the steering angle sensor 40, and calculate a steering angle accumulated during a steering operation, at step S20.

Then, the controller 60 may calculate a compensation gain depending on the temperature and the accumulated steering angle, based on the lookup table illustrated in FIG. 3.

The controller 60 may calculate a compensation gain attenuation rate depending on an operation time, based on a time required for reaching a normal state depending on the initial temperature, at step S40.

The time required for reaching the normal state depending on the initial temperature may be defined through a lookup table indicating that the time is inversely proportional to the temperature as illustrated in FIG. 4.

Therefore, the controller 60 may calculate a compensation gain attenuation rate depending on the operation time of the MDPS after the startup of the vehicle, based on the time required for reaching the normal state depending on the initial temperature.

The controller 60 may receive a column torque from the column torque sensor 10, receive a vehicle speed from the vehicle speed sensor 20, and calculate an assist torque for driving the driving motor (not illustrated) of the MDPS at step S50.

The controller 60 may receive the vehicle speed from the vehicle speed sensor 200, and calculate a vehicle speed gain which is decoupled depending on the vehicle speed as illustrated in FIG. 2, at step S60.

Based on the vehicle speed gain, the compensation gain and the compensation gain attenuation rate, the controller 60 may calculate the final compensation gain by applying the compensation gain and the compensation gain attenuation rate to the vehicle speed gain, at step S70.

The controller 60 may receive the column torque from the column torque sensor 10, and filter the column torque depending on the frequency region, at step S80. When steering is performed while the road surface is frozen or wet in an ultra-low temperature state, high-frequency noise may be amplified and applied to the assist torque. In this case, a control margin may be reduced to cause vibration. In order to solve such a problem, the controller 60 may optimize the compensation gain by performing filtering through a low-pass filter. Thus, a frictional force caused by low temperature can be reduced without a sense of difference in steering.

After filtering the column torque, the controller 60 may optimize the compensation gain by multiplying the filtered column torque by the final compensation gain, compensate for the assist torque, and output the final assist torque, at step S90.

At this time, in order to avoid the resonance frequency of the MDPS when outputting the final assist torque, the controller 60 may include any one of a lead-lag filter and notch filter to control the high-frequency gain. Thus, as illustrated in FIG. 5, the controller 60 may not increase the gain of the high-frequency region, but increase only the gain of the low-frequency region before the resonance frequency.

This operation may prevent a reduction in stability of the MDPS sensitive to high-frequency noise on a low-friction road while increasing a basic steering effort amount.

In order to control only the low-frequency region, the cutoff frequency of the filtering unit 66 may be set to the same frequency as the natural frequency of the lead-lag filter, such that a sudden change of the steering feel can be reduced without deformation of a characteristic pattern. Thus, a steering sense of difference can be removed while a heavy steering feel can be improved.

As described above, the control method of the apparatus for compensating for low-temperature torque of an MDPS in accordance with the embodiment of the present invention can not only remove a sense of difference during steering in response to an increase of friction caused by the contraction of the mechanical parts or the increase in viscosity of grease in the MDPS, but also increase the effort amount while suppressing an occurrence vibration during steering on a low-friction road at an ultra-low temperature, which makes it possible to improve the convenience.

Although exemplary embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for compensating for low-temperature torque of a motor driven power steering (MDPS) device, comprising:
    a column torque sensor configured to detect a column torque applied to a steering shaft, and output the detected column torque;
    a vehicle speed sensor configured to detect a vehicle speed;
    a temperature sensor configured to measure a temperature of the vehicle;
    a steering angle sensor configured to detect a steering angle of a steering wheel; and
    a controller configured to calculate an assist torque based on the column torque and the vehicle speed, calculate a vehicle speed gain and a compensation gain for the temperature and an accumulated steering angle based on the vehicle speed, the temperature and the steering angle, calculate a final compensation gain by applying a compensation gain attenuation rate depending on an operation time after a startup of the vehicle based on a time required for reaching a normal operating temperature state from an initial temperature state, calculate a final assist torque by applying the final compensation gain to the assist torque depending on a frequency region of the column torque, and output the final assist torque,
    wherein the controller comprises:
    an assist torque calculator configured to receive the column torque and the vehicle speed from the column torque sensor and the vehicle speed sensor, and calculate the assist torque;
    a filter configured to filter the column torque depending on the frequency region of the column torque inputted from the column torque sensor;
    a low-temperature torque compensation circuit configured to receive the vehicle speed, the temperature and the steering angle from the vehicle speed sensor, the temperature sensor and the steering angle sensor, respectively, calculate the vehicle speed gain and the compensation gain for the temperature and the accumulated steering angle, and calculate the final compensation gain by applying the compensation gain attenuation rate depending on the operation time, based on the time required for reaching the normal operating temperature state from the initial temperature state; and
    an assist torque output circuit configured to apply the final compensation gain outputted from the low-temperature torque compensation circuit to the column torque filtered by the filtering unit, compensate for the assist torque calculated by the assist torque calculator by reducing the resonance frequency of the MDPS through high-frequency gain control, and output the final assist torque.

2. The apparatus of claim 1, wherein the filter comprises a low pass filter.

3. The apparatus of claim 1, wherein the assist torque output circuit comprises any one of a lead-lag filter and a notch filter in order to avoid the resonance frequency of the MDPS.

4. The apparatus of claim 3, wherein the filter has a cutoff frequency equal to the natural frequency of the lead-lag filter.

5. The apparatus of claim 1, wherein the low-temperature torque compensation circuit comprises:
    a vehicle speed gain calculator configured to receive the vehicle speed from the vehicle speed sensor, and calculate the vehicle speed gain which is decoupled depending on the vehicle speed;
    a steering angle accumulator configured to calculate the accumulated steering angle by accumulating the steering angles received from the steering angle sensor;
    a compensation gain calculator configured to calculate the compensation gain depending on the temperature and the accumulated steering angle;
    a normal state reaching time calculator configured to calculate the time required for reaching the normal state depending on the initial temperature after the startup of the vehicle;
    a compensation gain attenuation rate calculator configured to calculate the compensation gain attenuation rate depending on the operation time, based on the time required for reaching the normal operating temperature state from the initial temperature state; and
    a compensation gain output circuit configured to receive the vehicle speed gain, the compensation gain and the compensation gain attenuation rate, and output the final compensation gain.

6. A control method for compensating for low-temperature torque of a motor driven power steering (MDPS) device, comprising:
    receiving, by a controller, a temperature from a temperature sensor after a startup of a vehicle in an initial operating temperature state;

receiving, by the controller, a steering angle from a steering angle sensor and calculating an accumulated steering angle;

calculating, by the controller, a compensation gain depending on the temperature and the accumulated steering angle;

calculating, by the controller, a compensation gain attenuation rate depending on an operation time, based on a time required for reaching a normal operating temperature state from the initial temperature state;

receiving, by the controller, a column torque and a vehicle speed from a column torque sensor and a vehicle speed sensor, respectively, and calculating an assist torque;

receiving, by the controller, the vehicle speed from the vehicle speed sensor, and calculating a vehicle speed gain;

calculating, by the controller, a final compensation gain by applying the compensation gain and the compensation gain attenuation rate to the vehicle speed gain; and receiving, by the controller, the column torque from the column torque sensor, filtering the column torque, applying the filtering result to the final compensation gain, compensating for the assist torque, and outputting a final assist torque, wherein the filtering of the column torque comprises filtering the column torque through a low pass filter.

7. The control method of claim 6, wherein the outputting of the final assist torque comprises avoiding the resonance frequency of the MDPS through one of a lead-lag filter and a notch filter.

8. The control method of claim 7, wherein, when the controller filters the column torque, a cutoff frequency is equal to the natural frequency of the lead-lag filter.

* * * * *